United States Patent [19]

Inagaki et al.

[11] Patent Number: 4,698,764

[45] Date of Patent: Oct. 6, 1987

[54] DIAGNOSTIC APPARATUS FOR CONTINUOUSLY VARIABLE TRANSMISSION

[75] Inventors: Takafumi Inagaki, Toyota; Hiroshi Sasaoka, Okazaki; Susumu Masutomi, Anjyo; Hiroshi Itoh; Mitsuru Takada, both of Toyota, all of Japan

[73] Assignee: Toyota Jidosha Kabushiki Kaisha, Toyota, Japan

[21] Appl. No.: 694,280

[22] Filed: Jan. 24, 1985

[30] Foreign Application Priority Data

Jan. 26, 1984 [JP] Japan .................................. 59-14010

[51] Int. Cl.$^4$ ............................................ B60K 41/00
[52] U.S. Cl. .................................... 364/424.1; 74/866
[58] Field of Search ...................... 364/424.1; 74/866; 474/12, 18, 28, 70

[56] References Cited

U.S. PATENT DOCUMENTS

| | | | |
|---|---|---|---|
| 4,079,638 | 3/1978 | Sibeud | 74/866 |
| 4,373,619 | 2/1983 | Schritt et al. | 74/866 |
| 4,387,608 | 6/1983 | Mohl et al. | 74/866 |
| 4,495,457 | 1/1985 | Stahl | 364/424.1 |
| 4,543,077 | 9/1985 | Yamamuro et al. | 74/866 |

FOREIGN PATENT DOCUMENTS 0080546  7/1981  Japan ........:............................ 74/866

Primary Examiner—Parshotam S. Lall
Attorney, Agent, or Firm—Oblon, Fisher, Spivak, McClelland, & Maier

[57] ABSTRACT

A diagnostic apparatus for a continuously variable transmission the speed ratio and/or the rate of variation in the speed ratio of which are controlled by a shift-regulating device controlled by command signals from a control system. The diagnostic apparatus, which checks if the speed ratio is normally controlled, comprises: a detecting device for detecting an actual speed ratio and/or an actual rate of variation in the speed ratio; a memory storing data for determining normal ranges of the speed ratio and/or normal ranges of the rate of variation in the speed ratio, the normal ranges corresponding to shifting conditions of the transmission which are established by the shift-regulating device according to the command signals; and a judging device for selecting one of the normal ranges of the speed ratio, and/or one of the normal ranges of the rate of variation in the speed ratio, based on the command signals, the judging device checking whether the detected actual speed ratio and/or the detected actual rate of variation in the speed ratio fall within the selected normal ranges.

29 Claims, 14 Drawing Figures

FIG. 3a

S1 : STORING THROTTLE OPENING ANGLE $\theta$, ACTUAL ENGINE SPEED NA, AND OUTPUT SHAFT SPEED NO IN RAM 106

S2 : DETERMINING TARGET ENGINE SPEED ND

S3 : CALCULATING ERROR E (ND−NA)

S5 : TURNING OFF SOLENOID VALVE 46 FOR SHIFT-UP

S6 : TURNING ON SOLENOID VALVE 46 FOR SHIFT-DOWN

S8 : TURNING ON SOLENOID VALVE 48

S10: TURNING OFF SOLENOID VALVE 48

S12: TURNING OFF SOLENOID VALVE 48

S14: TURNING ON SOLENOID VALVE 48

S17: TURNING ON AND OFF SOLENOID VALVE 48 AT DUTY CYCLE D

DIAGNOSTIC APPARATUS FOR CONTINUOUSLY VARIABLE TRANSMISSION

BACKGROUND OF THE INVENTION

The present invention relates generally to a continuously variable transmission for an automotive vehicle, and more particularly to a diagnostic apparatus capable of monitoring the control arrangement of the transmission to check for correct or normal control of the speed ratio of the transmission.

There has been proposed an automotive vehicle which is equipped with a continuously variable transmission for transmitting the output of its engine to its drive wheels at a steplessly variable speed ratio, and with a shift-regulating device for changing the speed ratio of the transmission and/or rate of variation in the speed ratio in response to command signals from a control system for the transmission. Such an automotive vehicle is capable of continuously varying the speed ratio depending upon the running conditions, and may consequently enjoy improved fuel economy. If desired, the speed ratio of the transmission, or the rate of variation in the speed ratio of the transmission, i.e., the shifting speed may be controlled in response to a variation in an error between the actual speed ratio or engine speed, and its target value. In this case, the shifting operation of the variable transmission is achieved with improved control response (stability).

In such an automotive vehicle, it is required to check the variable transmission and its control system for normal functioning, at the time of maintenance services or upon occurrence of a trouble with the transmission. For this purpose, the individual related components must be checked under various possible operating conditions of the transmission. This procedure is difficult to perform. Therefore, there has been a need to give the vehicle a self-diagnostic function for automatic monitoring and diagnosis of the transmission and the control system.

SUMMARY OF THE INVENTION

It is accordingly an object of the present invention to provide a diagnostic apparatus for automatic diagnosis of a continuously variable transmission of an automotive vehicle and a shift-regulating device for the transmission, to check for normal control of the speed ratio of the transmission.

According to the present invention, there is provided a diagnostic apparatus for a continuously variable transmission of an automotive vehicle for transmitting the output of an engine of the vehicle to drive wheels of the vehicle at a steplessly variable speed ratio, the vehicle having a control system, and a shift-regulating device which is responsive to the control system to change the speed ratio of the transmission, said diagnostic apparatus checking whether the speed ratio of the transmission is normally controlled, and comprising: detecting means for detecting an actual speed ratio of the transmission; memory means storing data for determining normal ranges of the speed ratio of the transmission corresponding to shifting conditions of the transmission which are to be established by the shift-regulating device according to command signals from the control system; and judging means for selecting one of the normal ranges of the speed ratio based on the command signals to the shift-regulating device, and checking whether the detected actual speed ratio falls within the selected normal range.

According to another aspect of the present invention, there is provided a diagnostic apparatus for a continuously variable transmission of an automotive vehicle for transmitting the output of an engine of the vehicle to drive wheels of the vehicle at a steplessly variable speed ratio, the vehicle having a control system, and a shift-regulating device which is responsive to the control system to change the speed ratio and a rate of variation in the speed ratio of the transmission, said diagnostic apparatus checking whether the speed ratio of the transmission is normally controlled, and comprising: detecting means for detecting an actual rate of variation in the speed ratio of the transmission; memory means storing data for determining normal ranges of the rate of variation in the speed ratio of the transmission corresponding to shifting conditions of the transmission which are to be established by the shift-regulating device according to command signals from the control system; and judging means for selecting one of the normal ranges of the rate of variation in the speed ratio based on the command signals to the shift-regulating device, and checking whether the detected actual rate of variation in the speed ratio falls within the selected normal range.

According to a further aspect of the invention, the diagnostic apparatus comprises: detecting means for detecting an actual speed ratio of the transmission, and an actual rate of variation in said actual speed ratio; memory means storing data for determining normal ranges of the speed ratio of the transmission, and data for determining normal ranges of the rate of variation in the speed ratio, the normal ranges corresponding to shifting conditions of the transmission which are to be established by the shift-regulating device according to command signals from the control system; and judging means for selecting one of the normal ranges of the speed ratio, and one of the normal ranges of the rate of variation in the speed ratio, based on the command signals to the shift-regulating device, and checking whether the detected actual speed ratio falls within the selected normal range of the speed ratio, and whether the actual rate of variation falls within the selected normal range of the rate of variation in the speed ratio.

The diagnostic apparatus of the present invention as constructed above makes it possible to check whether the speed ratio and/or the rate of variation in the speed ratio (shifting speed) of the continuously variable transmission is/are controlled in the correct or normal manner in response to the command signals applied to the shift-regulating device. In other words, the normal functioning of the transmission and the shift-regulating device can be checked by checking for the presence or absence of a trouble-indicating signal from the judging means. Accordingly, the operational abnormality in the control of the speed ratio of the transmission can be easily found without having to diagnosing the individual components of the transmission and related parts under various operating conditions.

According to one embodiment of the invention, the judging means is operative to select one of the normal ranges of the speed ratio while a rate of variation in opening angle of a throttle valve of the vehicle is smaller than a predetermined limit.

According to another embodiment of the invention, the judging means is operative to select one of the normal ranges of the rate of variation in the speed ratio while a margin of variation in the speed ratio to its upper or lower limit is greater than a predetermined value.

According to an advantageous embodiment of the invention, the diagnostic apparatus further comprises: code memory means for storing a coded signal indicative of a trouble recognized by the judging means; indicator means for indicating the trouble represented by the coded signal; and trigger means including an operator-controlled member, for causing the indicator means to indicate the trouble in response to the operation of the operator-controlled member.

In one form of the above advantageous embodiment, the trigger means is operative when the operator-controlled member is operated while the vehicle is stopped.

In another form of the above embodiment, the indicator means indicates the actual speed ratio detected by the detecting means, while the vehicle is running.

In the case where the shift-regulating device includes a shift-direction switching valve unit having a first solenoid, and a shift-speed control valve unit having a second solenoid, the diagnostic apparatus may further comprise detector means for detecting the disconnection and/or short-circuiting of conductor wires of the first and second solenoids, the code memory means storing coded signals indicative of disconnection and/or short-circuiting troubles detected by the detector means.

In a preferred form of the diagnostic apparatus including the code memory means, a plurality of troubles are recognized by the judging means and the detector means, and the corresponding plural coded signals are stored in the code memory, and output therefrom in a predetermined order in response to the operation of the operator-controlled member.

In one form of the diagnostic apparatus, the previously indicated indicator means comprises a voltmeter having an analog indicator needle and operated by serial pulses corresponding to the coded signal indicative of the trouble.

BRIEF DESCRIPTION OF THE DRAWING

The foregoing and other objects, features and advantages of the present invention will be better understood from reading the following description of the preferred embodiments taken in conjunction with the accompanying drawing in which:

FIGS. 3 and 3a are a flow chart illustrating the operation of the transmission;

DETAILED DESCRIPTION OF THE PREFERRED EMBODIMENTS

Referring now to the accompanying drawing, the invention will be more fully described in its preferred embodiments.

Figure 1:
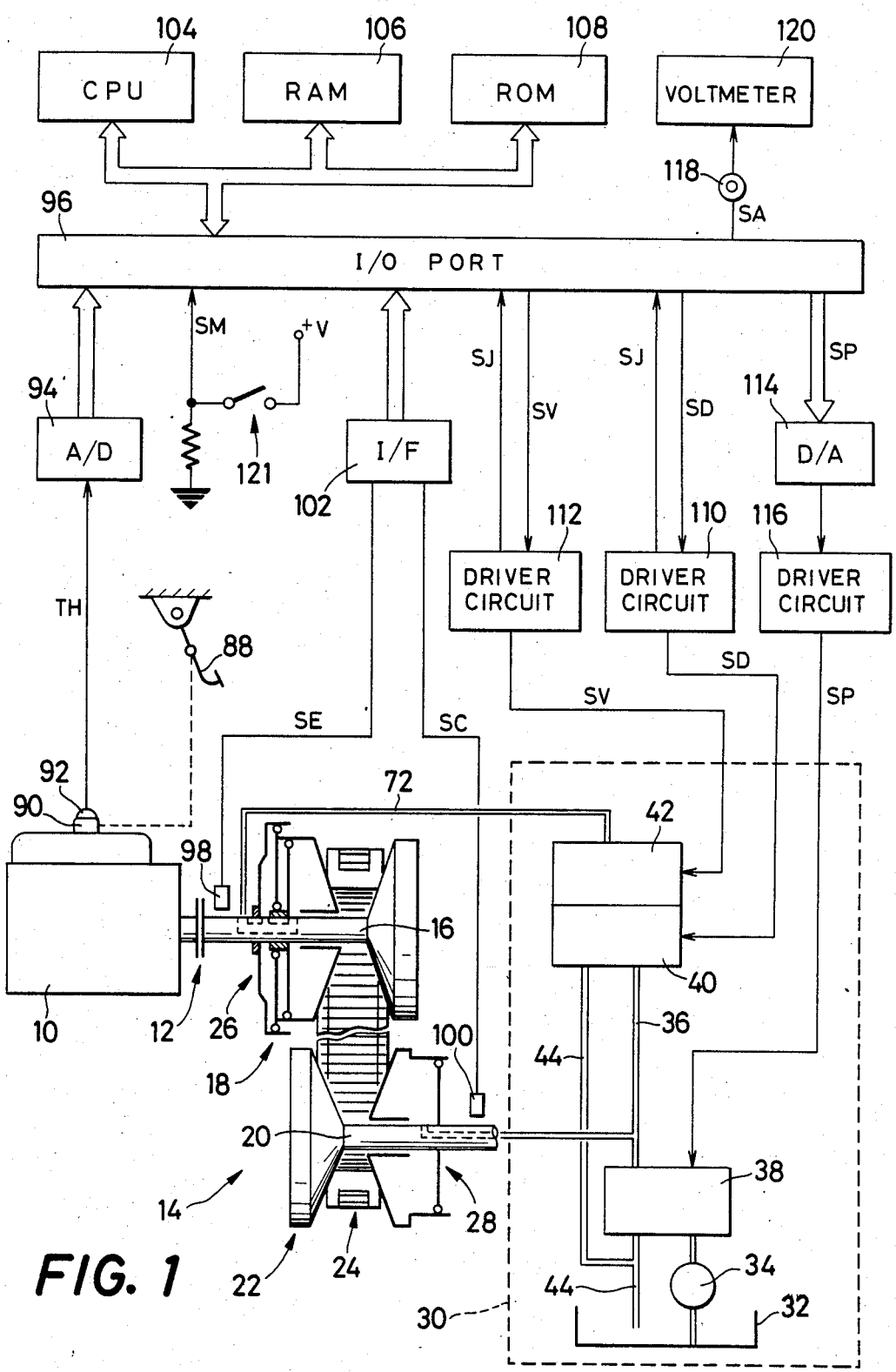
FIG. 1 is a schematic illustration of one embodiment of a diagnostic apparatus of the invention in operative connection with a hydraulically-operated continuously variable transmission and its control arrangements, used in an automotive vehicle.

There are shown in FIG. 1 a hydraulically-operated continuously variable transmission 14 of belt-and-pulley type for an automotive vehicle, and one embodiment of a diagnostic apparatus of the invention in operative connection with a control arrangement of the transmission. In the figure, reference numeral 10 designates an engine of the vehicle which is coupled with the variable transmission 14 via a suitable clutch 12 such as a fluid coupling, torque converter, electromagnetic clutch of magnetic-powder type, or centrifugal clutch. The transmission 14 serves to transmit the output of the engine 10 to drive wheels (not shown) of the vehicle such that the speed ratio of the engine 10 relative to the drive wheels is continuously variable, more precisely, at a controlled speed ratio of a rotating speed of an input shaft 16 over that of an output shaft 20. Described in more detail, the variable transmission 14 comprises the drive or input shaft 16 coupled to the clutch 12, and the driven or output shaft 20 coupled to the drive wheels via directional switching and differential gear devices to transmit the drive troque to the drive wheels. The transmission 14 further comprises: a first variable-diameter pulley 18 having a variable effective diameter and associated with the input shaft 16; a second variable-diameter pulley 22 having a variable effective diameter and associated with the output shaft 20; a transmission belt 24 connecting the first and second variable-diameter pulleys 18 and 22; and first and second hydraulic cylinders 26, 28 associated with the pulleys 18, 22, respectively, to change widths of Vee-grooves of the pulleys 18, 22 for varying their effective diameters engaging the loop of the transmission belt 24. The widths of the Vee-grooves of the pulleys 18, 22 are changed with a hydraulic pressure applied to pressure chambers in the respective hydraulic cylinders 26, 28, whereby the effective diameters of the first and second pulleys 18, 22 may be steplessly varied, that is, the speed ratio of the transmission 14 is continuously varied. The term "speed ratio" used herein is interpreted to mean a ratio of a rotating speed of the input shaft 16 over that of the output shaft 20, as previously indicated. The supply and discharge of a hydraulic working fluid to and from the first and second hydraulic cylinders 26, 30 are controlled by a hydraulic control device 30 which will be described.

The hydraulic control device 30 comprises: (1) a hydraulic pump 34 which pumps up the hydraulic fluid from a reservoir 32 and delivers the pressurized fluid to a line-pressure conduit 36 connected to the second hydraulic cylinder 28 associated with the second pulley 22 on the output shaft 20; (2) a line-pressure control valve 38 to adjust the amount of flow of the fluid from the line-pressure conduit 36 to a drain conduit 44, and thereby regulate the line pressure in the line-pressure conduit 36; (3) a shift-direction switching valve unit 40 which is adapted to change a direction in which the speed ratio of the transmission 14 is changed (direction in which the transmission 14 is shifted), i.e., a direction of variation in the speed ratio of the transmission 14, such that the switching action of the valve unit 40 selectively permits either the supply of the pressurized fluid from the line-pressure conduit 36 toward the first hydraulic cylinder 26 to increase the effective diameter of the first variable-diameter pulley 18, or the discharge of the fluid out of the hydraulic cylinder 26 into the drain conduit 44 to reduce the effective diameter of the first variable-diameter pulley 18; and a shift-speed control valve unit 42 which is adapted to control a rate of supply or discharge flow of the pressurized fluid to or from the first hydraulic cylinder 26, and thereby control a rate of variation in the speed ratio of the variable transmission 10.

The line-pressure control valve 38 is provided with a linear solenoid for continuously changing the return flow of the fluid into the drain conduit 44. This solenoid is operated in response to a LINE PRESSURE signal SP generated from a driver circuit 116 (which will be described), such that the line pressure in the line-pressure conduit 36 may be regulated based on the running conditions of the vehicle such as an actual speed ratio of the transmission 14, an actual speed of the engine 10 and an opening angle of a throttle valve.

Figure 2:
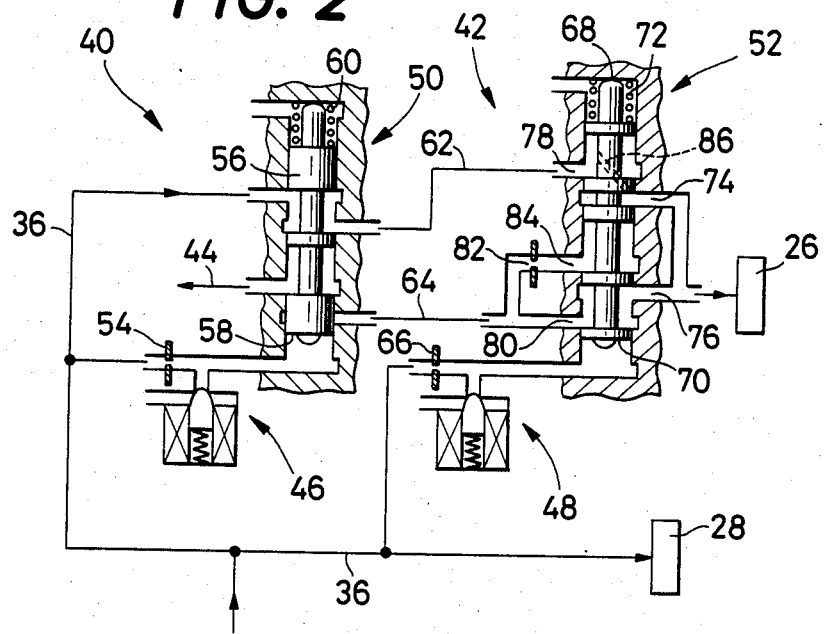
FIG. 2 is a fragmentary view of a shift-regulating valve assembly for controlling the speed ratio and the rate of variation in the speed ratio of the transmission.

The shift-direction switching valve unit 40 and the shift-speed control valve unit 42 constitute a shift-regulating valve assembly (shift-regulating device). As illustrated in FIG. 2, the valve unit 40 includes a pilot solenoid valve 46 and a spool valve 50 controlled by the pilot valve 46. Similarly, the valve unit 42 includes a pilot solenoid valve 48 and a spool valve 52 controlled by the pilot valve 48.

The solenoid valve 46 is supplied with the line pressure from the line-pressure conduit 36, through an orifice 54 provided in a passage connecting the conduit 36 and the valve 46. With the solenoid valve 46 placed in its closed position (deenergized or OFF position), the line pressure through the orifice 54 is applied to an end face 58 of a spool 56 of the spool valve 50, and the spool 56 is moved against a biasing force of a spring 60. With the solenoid valve 46 operated into its open position (energized or ON position), the line pressure through the orifice 54 is released, and the spool 56 is moved under the biasing action of the spring 60. Thus, the spool 56 is moved between its two significant positions in response to the operation of the solenoid valve 46. In the first position on the side of the biasing spring 60, the line-pressure conduit 36 is connected to a supply conduit 62, while a discharge conduit 64 is disconnected from the drain conduit 44. Thus, the spool 56 in the first position allows the line pressure to be applied to the first hydraulic cylinder 26. FIG. 2 shows the spool 56 placed in its first position. On the other hand, the spool 56 placed in its second position remote from the spring 60 causes the supply conduit 62 to be disconnected from the line-pressure conduit 36, but causes the discharge conduit 64 to communicate with the drain conduit 44, thereby allowing the pressurized fluid in the first hydraulic cylinder 26 to be discharged into the drain conduit 44. In summary, the shift-direction switching valve unit 40 is capable of selectively permitting the supply and discharge of the working fluid toward and from the first hydraulic cylinder 26 depending upon the currently selected position of the spool 56 which is controlled by the solenoid valve 46, and thus able to control the direction in which the effective diameter of the first variable-diameter pulley 18 is changed, that is, the direction of change of the speed ratio (shifting direction) of the continuously variable transmission 14.

In the meantime, the solenoid valve 48 of the shift-speed control valve unit 42 is supplied with the line pressure through an orifice 66 which is provided in a passage connecting the line-pressure conduit 36 and the solenoid valve 48. Like the solenoid valve 46, this solenoid valve 48, when placed in its closed or deenergized position, permits the line pressure through the orifice 66 to be applied to an end face 70 of a spool 68 of the spool valve 52, with a result of moving the spool 68 against a biasing force of a spring 72 to its first position. With the solenoid valve 48 placed in its open or energized position, the line pressure through the orifice 66 is released, and the spool 68 is moved with spring 72 to its second position. The spool valve 52 has a first port 74 and a second port 76 which communicate with the hydraulic cylinder 26. The spool valve 52 further has a supply port 78 connected to the supply conduit 62, a discharge port 80 connected to the discharge conduit 64, and a reducing port 84 connected to the discharge conduit 64 through an orifice 82. When the spool 68 is moved to its first position on the side of the spring 72 with the solenoid valve 48 set in the closed position due to deenergization of its solenoid, the communication between the second and reducing ports 76, 80 is lost, and the second port 76 is brought into communication with the discharge port 80 while the first port 74 is brought into communication with the supply port 78 through a restrictor passage 86 formed in the spool 68. When the spool 68 is moved to its second position upon closure of the solenoid valve 48 upon energization of its solenoid, the first and second ports 74, 76 are put into communication with the supply and reducing ports 78, 84, respectively, while the communication between the second and discharge ports 76, 80 is lost.

Stated the other way, the spool 68 of the spool valve 52 is moved between its two significant positions, that is, a supply-restricting position at which the supply flow of the fluid from the supply conduit 62 to the first port 74 is restricted, and a non-restricting position at which the above supply flow is not restricted. At the same time, the above two positions correspond to a discharge-restricting position at which the discharge flow of the fluid from the second port 76 to the discharge conduit 64 is restricted, and a non-restricting position at which the discharge flow is not restricted. In the shift-speed control valve unit 42 wherein the two positions of the spool 68 are selected by the solenoid valve 48, the fluid flows to and from the first hydraulic cylinder 26 are controlled, so that the speed of shifting motions of the transmission 14 in both directions can be changed. More specifically, the control valve unit 42 is capable of changing a rate at which the speed ratio of the transmission 14 is varied, the direction of variation being determined by the current position of the shift-direction switching valve unit 40. In short, the shifting direction and speed of the transmission 14 are controlled by the solenoid valves 46 and 48 of the valve units 40 and 42, respectively. These solenoid valves 46, 48 are controlled by SHIFT DIRECTION and SHIFT VELOCITY command signals SD and SV (which will be described), so that the speed ratio of the transmission 14 is held at the optimal level to meet the current running conditions of the vehicle. As previously indicated, the shift-regulating valve assembly (shift-regulating device) is constituted by the shift-direction switching valve unit 40 and the shift-speed control valve unit 42, and the SHIFT DIRECTION and SHIFT VELOCITY command signals SD, SV act as command signals for operating the shift-regulating valve assembly.

As shown in FIG. 1, the engine 10 is provided with an intake manifold in which is provided a throttle valve 90 operated by an accelerator pedal 88. The throttle valve 90 is provided with a throttle sensor 92 which senses an angle of opening $\theta$ of the throttle valve 90. The throttle sensor 92 generates a THROTTLE voltage signal TH indicative of the opening angle $\theta$. The THROTTLE voltage signal TH is applied to an A/D converter 94 which converts the voltage signal TH into a coded signal, and feeds the coded signal to an I/O port 96.

Adjacent to the input and output shafts 16, 20 of the transmission 14, there are respectively disposed a first and a second rotation sensor 98, 100 for detecting rotating speeds of the input and output shafts 16, 20, respectively. The first rotation sensor 98 produces an INPUT ROTATION signal SE whose number of pulses corresponds to the rotating speed of the input shaft 16, which in turn corresponds to the number of revolution of the crank shaft of the enging 10. In the meantime, the second rotation sensor 100 produces an OUTPUT ROTATION signal SC whose number of pulses corresponds to the rotating speed of the output shaft 20, which in turn corresponds to the running speed of the vehicle. These INPUT and OUTPUT ROTATION signals SE, SC are applied to an I/F circuit 102, which converts the ROTATION signals SE, SC into coded signals which represent the number of pulses per unit time of the signals SE, SC. The coded signals from the I/F circuit 102 are fed to the I/O port 96.

The I/O port 96 is connected via a data bus line to a CPU (central processing unit) 104, a RAM (random access memory) 106 and a ROM (read only memory) 108. The CPU 104 processes the signals received via the I/O port 96, according to a program stored in the ROM 108 and utilizing the data storage function of the RAM 106, and the CPU 104 feeds to driver circuits 110 and 112 the previously indicated SHIFT DIRECTION and VELOCITY command signals SD, SV representative of the shifting direction (direction in which the speed ratio is changed) and the shifting speed (speed at which the speed ratio is varied) of the transmission 14, respectively. Further, the CPU 104 feeds to a driver circuit 116, via a D/A converter 114, the previously indicated LINE PRESSURE signal SP representative of the line pressure in the line-pressure conduit 36. The signals SD, SV and SP are amplified by the respective driver circuits 110, 112, 116, and applied to the solenoids of the solenoid valves 46, 48, and to the linear solenoid of the line-pressure control valve 38, respectively. The control valve 38 regulates the line pressure so as to be held as low as possible within the range in which the transmission belt 24 will not slip on the pulleys 18, 22, in order to assure minimum power loss of the engine 10. In addition, the speed ratio of the transmission 14 is controlled so as to assure maximum fuel economy of the engine 10. In this embodiment, therefore, the CPU 104, RAM 106, and ROM 108 constitute an essential part of a control system for the transmission 14, and the ROM 108 serves as memory means. A removable connector 118 is provided to connect indicator means in the form of a voltmeter 120 to the I/O port 96. While the voltmeter 120 is provided to indicate the currently detected speed ratio of the transmission 14, and later described TROUBLE codes indicative of troubles, it is possible to use a tester in combination with the voltmeter 120 for testing other parts of the vehicle. As described later in detail, the TROUBLE codes may be indicated by the voltmeter 120 by manipulating an operator-controlled diagnostic switch 121 connected to the I/O port 96. While the diagnostic switch 121 is operated, a signal SM is applied to the I/O port 96.

Referring next to a flow chart of FIG. 3, the operation of the control system of the variable transmission 14 will be described.

Figure 4:
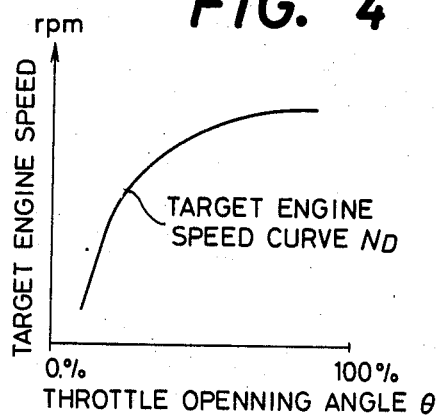
FIG. 4 is a graph showing an example of a curve of a target engine speed as a function of the opening angle of a throttle valve of the vehicle engine.

At first, the control executes step S1 to store in the RAM 106 the following data: data indicative of the throttle opening angle $\theta$ represented by the THROTTLE signal TH from the throttle sensor 92; data indicative of the actual rotating speed of the input shaft 16, i.e., the actual engine speed $N_A$, represented by the INPUT ROTATION signal SE; and data indicative of the actual rotating speed $N_O$ of the output shaft 20 corresponding to the vehicle speed, represented by the OUTPUT ROTATION signal SC. In the next step S2, the CPU 104 determines a target engine speed $N_D$ based on the throttle opening angle $\theta$. This target engine speed $N_D$ is determined according to a predetermined relation as shown by a curve of FIG. 4, between the throttle opening angle $\theta$ and the target engine speed $N_D$, which relation is represented by a data map stored in the ROM 108. The above relation or data map is predetermined primarily so that the required output of the engine 10 represented by the THROTTLE signal TH is achieved with the minimum fuel consumption, i.e., with the maximum fuel economy. In this connection, it is possible to determine the target engine speed $N_D$ based on a predetermined relation between the throttle opening angle $\theta$ and the actual running speed of the vehicle. Further, the throttle opening angle $\theta$ may be replaced by an amount of operation of the accelerator pedal 88, a vacuum pressure in the intake manifold of the engine 10, or other variables which represent the currently required output of the engine 10.

Then, the control goes to step S3 to calculate an error $E (=N_D-N_A)$ between the target engine speed $N_D$ determined in step S2, and the actual engine speed $N_A$ obtained in step S1. This step S3 is followed by step S4 to check whether the error E is positive or negative.

When the value of the error E is negative, it means that the actual engine speed $N_A$ is higher than required, and consequently the transmission 14 should be shifted up (the speed ratio should be decreased). Therefore, if the error E is negative and the control goes to step S5, the solenoid valve 46 is held OFF (deenergized) in the absence of the SHIFT DIRECTION command signal SD, and the spool 56 of the spool valve 50 is kept in its first position to supply the pressurized fluid to the first hydraulic cylinder 26 so as to increase the effective diameter of the first variable-diameter pulley 18 on the input shaft 16, whereby the speed ratio of the transmission 14 is decreased. That is, the transmission 14 is shifted up by means of the shift-direction switching valve unit 40. On the other hand, if the valve of the error E is positive, the control goes from step S4 to step S6 to effect the shift-down motion of the transmission 14. More specifically, the step S6 is executed to apply the SHIFT DIRECTION command signal SD to the solenoid valve 46 of the shift-direction switching valve unit 40, and thus energize the solenoid valve 46. Consequently, the spool 56 of the spool valve 50 is moved to its second position to allow the pressurized fluid to be discharged from the first hydraulic cylinder 26, whereby the effective diameter of the first pulley 18 is reduced to increase the speed ratio of the transmission 14. As described above, the speed ratio is controlled so that the error E is zeroed, in other words, so that the actual engine speed $N_A$ coincides with the target engine speed $N_D$.

Figure 5:
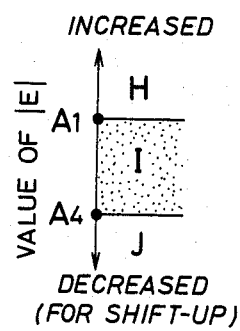
FIGS. 5 and 6 are illustrations explaining control operations of a shift-speed control valve unit according to ranges of an error value between the target and actual engine speeds during shift-up and shift-down operations of the transmission, respectively.
Figure 6:
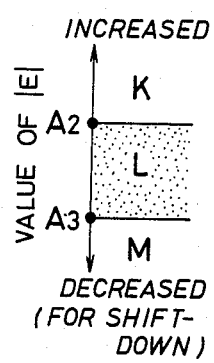

Following the step S5 or S6, the control evaluates the absolute value $|E|$ of the error E, so that the shifting rate of the transmissional 14 (rate of variation in the speed ratio) is controlled based on this evaluation, by the shift-speed cotnrol valve unit 42. In the present embodiment, the ROM 108 stores data representative of critical values A1 and A4 which define three ranges H, I and J of the value $|E|$, as shown in FIG. 5, which ranges are applicable when the shift-up step S5 is selected. The ROM 108 further stores data representative of critical values A2 and A3 defining three ranges K, L and M of the absolute value $|E|$, as shown in FIG. 6, which ranges are applicable when the shift-down step S6 is selected. The critical values A1, A4, A2 and A3 are determined so as to satisfy the following relations:

$$A1 \geq A4; A2 \geq A3; \text{ and } A3 \geq A4$$

The above relations and the use of different critical values for the shift-up and shift-down operations are based on the general recognition that the response of the speed-ratio variation is faster in the case where the transmission 14 is shifted down by reducing the effective diameter of the first pulley 18, than in the case where the transmission 14 is shifted up by increasing the effective diameter of the first pully 18. That is, it is desired to start restraining the rate of variation in the speed ratio of the transmission 14 at an earlier point of time in the former case, than in the latter case.

Figure 7:
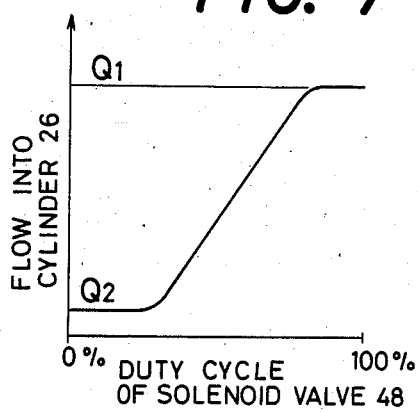
FIGS. 7 and 8 are graphical representations showing changes in the amounts of fluid flow through a shift-speed control valve unit of the valve assembly of FIG. 2 to and from the input-side hydraulic cylinder of the transmission, in relation to a duty cycle of a signal applied to actuate a solenoid of the shift-speed control valve unit.

Going back to the shift-up operation in step S5, the control then goes to step S7 to judge whether the value $|E|$ is greater than the value A1 or not. If the value $|E|$ is greater than the value A1, it means that there exists an excessive difference between the target and actual engine speeds $N_D$ and $N_A$ and consequently the rate of variation in the speed ratio should be increased. In other words, the control goes to step S8 wherein the SHIFT VELOCITY command signal SV is applied to the solenoid valve 48 of the shift-speed control valve unit 42 to hold the solenoid valve 48 in the ON position. With the solenoid valve 48 turned ON, the spool 68 of the spool valve 52 is moved by the biasing force of the spring 72 to its non-restricting position remote from the spring 72, at which the supply conduit 62 is brought into communication with the first port 74, and the pressurized fluid from the line-pressure conduit 36 is fed rapidly to the first hydraulic cylinder 26 without restriction. As a result, the effective diameter of the first variable-diameter pulley 18 is rapidly increased, and the rate of decrease in the speed ratio (shifting-up speed) is set to the maximum level. In this condition, the supply flow of the fluid into the cylinder 26 is held at the level Q1 shown in FIG. 7.

In the event the CPU 104 judges in step S7 that the absolute value $|E|$ is not greater than the value A1 (not within the range H), the step S7 is followed by step S9 wherein the CPU 104 judges whether the value $|E|$ is equal to or smaller than the value A4, i.e., whether the value $|E|$ falls within the range J. If the difference between the target and actual engine speeds $N_D$ and $N_A$, and the value $|E|$ is judge to be equal to or smaller than the value A4, the CPU 104 goes to step S10 wherein no SHIFT VELOCITY command signal SV is applied to the solenoid valve 48 of the shift-speed control valve unit 42, whereby the solenoid valve 48 is held OFF (deenergized). In this position, the spool 68 of the spool valve 52 is held in its flow-restricting position on the side of the spring 72, whereby the supply flow of the fluid to the hydraulic cylinder 26 is restricted. Therefore, the effective diameter of the pulley 18 is slowly increased, and accordingly the shifting-up speed of the transmission 14 is decreased. Thus, the otherwise possible overshoot of the transmission is avoided, and the speed ratio is smoothly changed to its optimum level. In this flow-restricting condition, the supply flow of the fluid into the hydraulic cylinder 26 is held at a level Q2 shown in FIG. 7.

Figure 8:
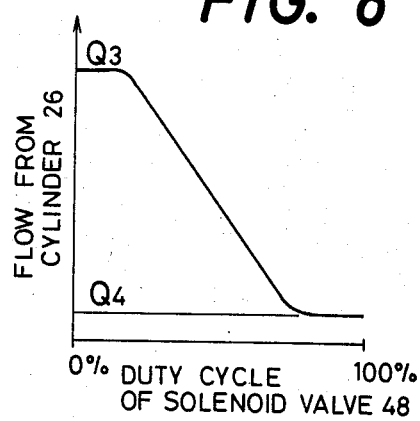

In the case where the transmission 14 is shifted down in step S6 by the shift-direction switching valve unit 40, steps S11-S14 similar to the steps S7-S10 are performed. In steps S11 and S13, the critical values A2 and A3 are used in place of the values A1 and A4 used in the corresponding steps S7 and S9. If the judgement in step S11 reveals that the value $|E|$ is greater than the value A2, step S12 is executed to turn OFF the solenoid valve 48 in the absence of the SHIFT VELOCITY command signal SV. Accordingly, the spool 68 of the spool valve 52 is moved to the non-restricting position at which the fluid is rapidly discharged from the hydraulic cylinder 26. As a result, the transmission 14 is shifted down at a relatively high rate. However, if the value $|E|$ is judged in step S11 not to be larger than the value A2, and in step S13 to be equal to or smaller than the value A3, the solenoid valve 48 is kept ON with the SHIFT VELOCITY command signal SV applied in step S14. Consequently, the spool valve 68 is held in the flow-restricting position at which the discharge flow from the cylinder 26 is restricted. Hence, the transmission 14 is shifted down at a relatively low rate. The non-restricted discharge flow in step S12, and the restricted discharge flow in step S14, are held at levels Q3 and Q4 shown in FIG. 8.

The foregoing description relates to the shifting-up and shifting-down operations of the transmission 14 wherein the absolute value $|E|$ $(=N_D-N_A)$ between the target and actual engine speeds falls within the predetermined higher range (H of FIG. 5 or K of FIG. 6), or within the lower range (J of FIG. 5 or M of FIG. 6). While the absolute value $|E|$ is judged to fall within an intermediate range I of FIG. 5 defined by the values A1 and A4, or an intermediate range L of FIG. 6 defined by the values A2 and A3, the solenoid valve 48 of the shift-speed control valve unit 42 is turned ON and OFF at a controlled duty cycle in dependence upon the absolute valve $|E|$, so that the speed ratio of the transmission 14 is smoothly controlled with a high response.

Stated in greater detail, while the shift-direction switching valve unit 40 is set for shifting up the transmission 14 with the spool 56 placed in its first position, and if the judgements in steps S7 and S9 reveal that the absolute value $|E|$ is not larger than the value A1 and not smaller than the value A4 (if the judgement in step S9 is negative), the step S9 is followed by step S15 wherein the duty cycle D of the SHIFT VELOCITY command signal SV is determined so as to increase as the absolute value |E| is increased. In this step S15, for example, the duty cycle D is calculated according to the following equation (1) which is represented by the data stored in the ROM 108:

$$D = [(1/B) \times |E| \times C] \times 1/100 \tag{1}$$

where, B, C: constants.

Assuming that B=1000, C=0.3, A1=300, and A4=50, the duty cycle D is determined based on the above equation (1) while the value |E| is held within the range between 50 and 300 (rpm). In this specific example, the duty cycle D is varied within the range between 35% and 65%, depending upon the absolue value |E|.

On the other hand, while the shift-direction switching valve unit 40 is set for shifting down the transmission 14, and if the judgements in steps S11 and S13 reveal that the value |E| is not larger than the value A2 and not smaller than the value A3 (if the judgement in step S13 is negative), the step S13 is followed by step S16 wherein the duty cycle D of the SHIFT VELOCITY command signal SV is determined so as to decrease as the absolute value |E| is increased. In this step S16, for example, the duty cycle D is calculated according to the following equation (2):

$$D = \{1 - [(1/B) \times |E| + C]\} \times 1/100 \tag{2}$$

where, B, C: constants.

The aforementioned step S15 or S16 is followed by step S17 wherein the solenoid valve 48 is operated (turned ON and OFF) at the duty cycle D which has been determined in the step S15 or S16 as discussed above. In other words, the SHIFT VELOCITY command signal SV of the determined duty cycle is applied to the solenoid valve 48. With this duty cycle control of the solenoid valve 48, the fluid supply to the first hydraulic cylinder 26 is controlled as shown by a curve shown in FIG. 7 to control the shift-up speed of the transmission 14, or the fluid discharge from the cylinder 26 is controlled as shown by a curve in FIG. 8 to control the shift-down speed. Upon completion of the step S17, the control goes the next step S18 (which will be described in detail), and back to the first step S1 to repeat the sequence of operations described hitherto so that the duty cycle D is determined depending upon the absolute value |E| of the newly calculated error E. The solenoid valve 48 of the shift-speed control valve unit 42 is operated at the newly determined duty cycle D. It is noted that the control goes back to the first step S1 via the step S18, after completion of the steps S8, S10, S12 and S14. In summary, the repetition of the foregoing sequence of operations permits the control of the rate of variation in the speed ratio of the variable transmission 14, for the primary purpose of running the vehicle with minimum fuel consumption.

With the hydraulic control device 30 and the control system including the CPU 104, whose arrangements and operations have been described hereinbefore, the actual engine speed $N_A$ is controlled so as to approach the determined engine speed $N_D$ such that the rate of approach is slowed down as the actual value $N_A$ approaches the target value $N_D$. Therefore, the speed ratio of the transmission 14 is controlled with an improved response without an overshoot or hunting trouble.

While the variable transmission 14 is controlled in its speed ratio in response to the actual running conditions of the vehicle as discussed hitherto, it is desired to check whether the control of the speed ratio is normally implemented. For this purpose, the indicator means in the form of the voltmeter 120 is connected to the I/O port 96, and the control system is adapted to perform a diagnostic routine (step S18) as a part of the program shown in the flow chart of FIG. 3.

Figure 9:
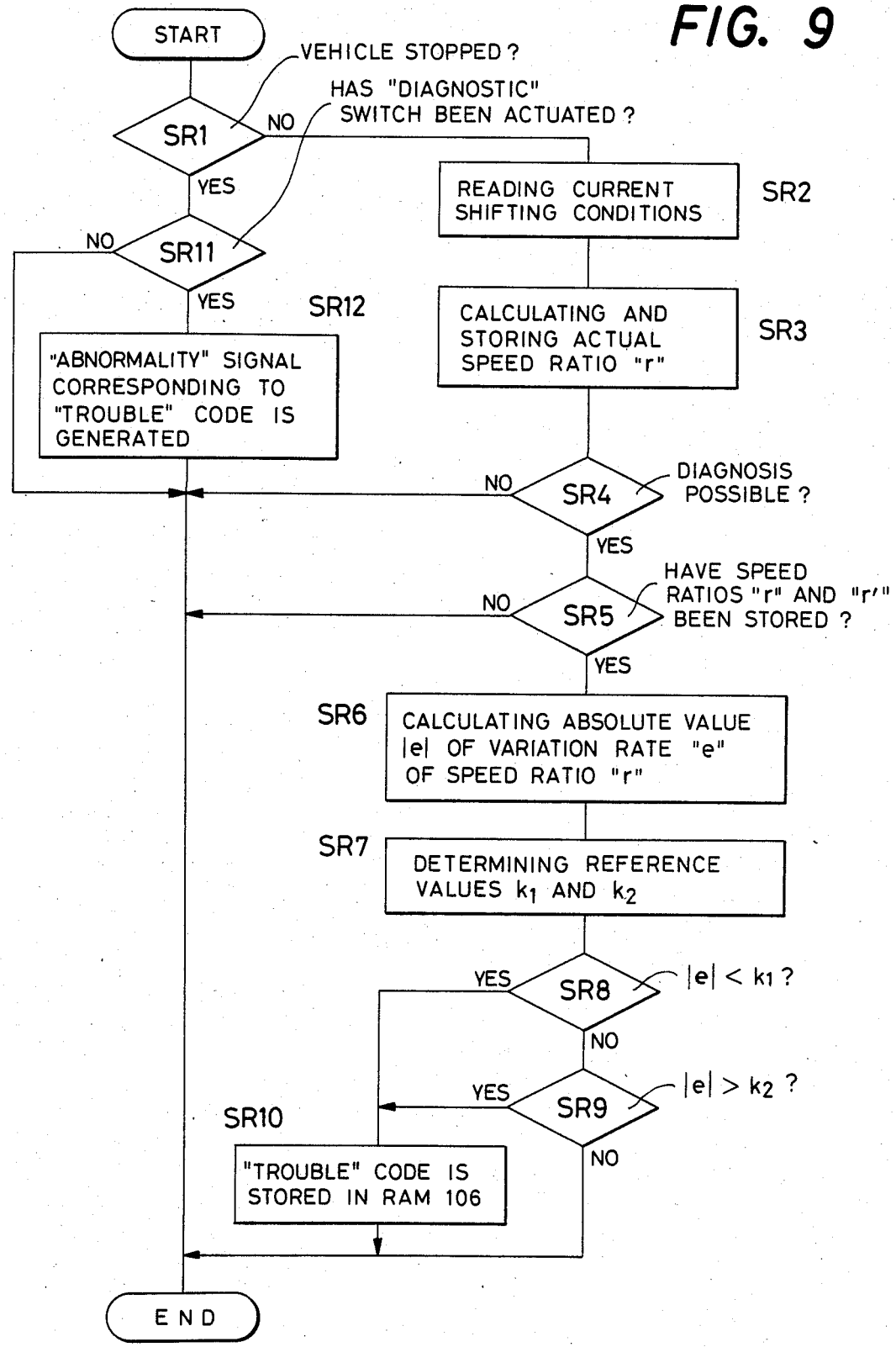
FIG. 9 is a flow chart showing the operation of the diagnostic apparatus of FIG. 1.

The diagnostic routine in step S18 is shown in FIG. 9, wherein the control first goes to step SR1 to check if the vehicle is stopped or not. This checking is effected, for example, by judging whether the rotating speed $N_O$ of the output shaft 20 is lower than a predetermined limit. If the judgement in step SR1 reveals that the vehicle is running, step SR1 is followed by step SR2.

Figure 11:
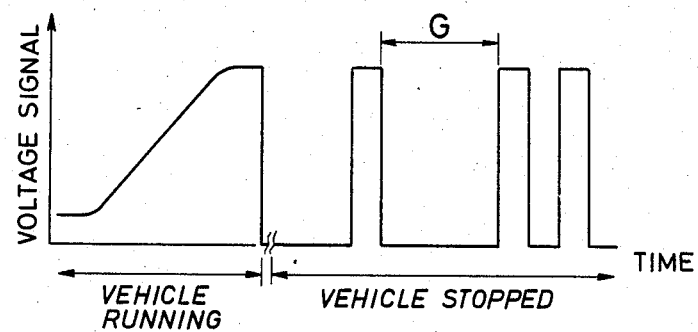
FIG. 11 is a graphical representation of a waveform of one example of an trouble-indicating voltage signal.

In this step SR2, the CPU 104 reads the current shifting direction and speed (hereinafter referred to as "shifting conditions") which have been determined by the judgements in steps S4, S7, S9, S11 and S13. In the next step SR3 which corresponds to means for detecting and calculating the current speed ratio (actual speed ratio), the current speed ratio "r" of the variable transmission 14 is calculated based on the INPUT and OUTPUT ROTATION signals SE, SC from the first and second rotation sensors 98, 100, and the calculated speed ratio "r" is stored in the RAM 106. As previously defined, the speed ratio "r" is interpreted to mean a ratio of the rotating speed of the input shaft 16 over that of the output shaft 20. As soon as the speed ratio "r" is calculated, a signal corresponding to the calculated speed ratio "r" is applied to the voltmeter 120, which therefore indicates a voltage representative of the current speed ratio "r" while the vehicle is running, as illustrated in FIG. 11. More specifically, the varying condition of the speed ratio "r" of the variable transmission 14 can be monitored by way of reading the analog indicator needle of the voltmeter 120. The signal applied to the voltmeter 120 is a pulse signal having a duty cycle corresponding to the current speed ratio "r", and consequently the voltage level corresponding to the duty cycle of the pulse signal is indicated on the voltmeter 120. However, it is appreciated to use an A/D converter to convert the coded signal from the I/O port 96 representative of the speed ratio "r", into an analog voltage signal which is applied to the voltmeter 120.

Successively, the control goes to step SR4 to check if the diagnosis is possible or not. If the judgement in this step is affirmative, the control goes to step SR5. If the judgement is negative, the diagnostic routine is terminated. Stated in more detail, the CPU judges in step SR4 whether there exists a sufficient margin of variation of the speed ratio, i.e., more than a predetermined margin between the speed ratio "r" determined in the preceding step SR3, and the upper or lower limit to which the speed ratio can be varied during the shifting-up or shifting-down operation. If there exists more than the predetermined margin of variation, that is, if the determined actual speed ratio "r" is not close to its upper or lower limit, the CPU 104 judges in step SR4 that the diagnosis is possible. The checking in this step SR4 is intended to avoid an otherwise possible diagnostic error that the mechnical locking of the speed ratio at its upper or lower limit is falsely deteched as a trouble of the transmission 14 or related components.

In the step SR5 following the step SR4, the CPU 104 checks if the calculation of the speed ratio "r" in step SR3 has been made two or more consecutive times, that is, checks whether the current and preceding speed ratios "r" and "r'" have been stored in the RAM 106. If the checking in step SR5 is negative, the diagnostic routine is immediately terminated. If the checking in step SR5 is affirmative, the control goes to step SR6 to obtain an absolute value $|e|$ of the actual rate of variation "e" in the speed ratio (shifting rate), based on the current and preceding values "r" and "r'" of the speed ratio obtained in step SR3, and on a time interval $\Delta T$ between "r" and "r'", and according to the following equation (3):

$$|e|=|r-r'|/\Delta T \qquad (3)$$

The time interval $\Delta T$ is time duration, for example, 100 ms, between the moment at which the step SR3 in one control cycle is executed, and the moment at which the same step is executed in the next control cycle. In the present invention, the first and second rotation sensors 98, 100, and the step SR6 constitute the means for detecting and determining the actual rate of variation in the speed ratio of the transmission 14.

After the value $|e|$ has been calculated in step SR6, the control goes to step SR7 to select or determine two reference values k1 and k2 (k1 smaller than k2) according to the current shifting condition determined in step SR2. These reference values k1 and k2 are lower and upper limits which define a normal range of the shifting rate (rate of variation in the speed ratio) for each shifting condition. When the absolute value $|e|$ falls within this normal range, the CPU 104 judges that the control of the speed ratio or the shifting operation of the transmission 14 is normally executed. If the vlaue $|e|$ does not fall within the normal range, the CPU 104 judges that the shifting operation is not performed in the normal or correct manner. The reference values k1 and k2 are determined for making the above judgement.

Figure 10:
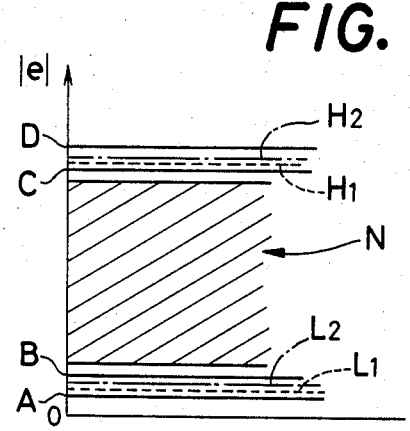
FIG. 10 is a diagrammatic representation showing upper and lower limits defining normal ranges of a rate of variation in speed ratio of the transmission, which are used as diagnostic references or standards.

The two reference values k1 and k2 are selected, depending upon the specific shifting condition, from among four reference values A, B, C and D which are stored in the memory means, i.e., ROM 18, and which have the relations $(0<A<B<C<D)$ as indicated in FIG. 10. To judge whether or not the shifting operation is performed normally, the calculated value $|e|$ is compared with the reference values k1 and k2.

Put in greater detail, the reference values A, B, C and D are determined as shown in FIG. 10 and described below. The reference value A is close to zero, and determined to be slightly smaller than a value L1 which is a minimum shift-up rate Umin or minimum shift-down rate Vmin, which ever is smaller. The reference value B is selected to be slightly larger than a value L2 which is the value Umin or Vmin, whichever is larger. The reference value C is determined to be slightly smaller than a value H1 which is a maximum shift-up rate Umax or maximum shift-down rate Vmax, whichever is smaller. The reference value D is determined to be sufficiently larger than the value Umax or Vmax, whichever is larger. Further, the reference values B and C are selected to be smaller and larger than lower and upper limits, respectively, of a standard range N within which the shifting speed "e" (rate of variation "e" in the speed ratio "r") is changed during the duty cycling control of the speed ratio. Therefore, the values A and B are selected as the reference values k1 and k2 for the shifting condition of step S10 and S14 of FIG. 3 (while the shifting rate is low). The values C and D are selected as the reference values k1 and k2 for the shifting condition of step S8 or S12 (while the shifting rate is high). Further, the values B and C are selected for the shifting condition of step S15 or S16 (while the shifting rate is intermediate).

In steps SR8 and SR9 following the step SR7 of selecting the two reference values k1 and k2, the value $|e|$ is compared with the selected reference values k1 and k2 to check if the value $|e|$ falls within the range of $k1 \leq |e| \leq k2$, that is, to judge whether the shifting operation is effected normally or not. If the judgement reveals the normal shifting operation, the diagnostic routine is immediately terminated. If the judgement reveals the abnormal shifting operation, the step SR8 or SR9 is followed by step SR10 wherein a TROUBLE code (coded signal) indicative of the abnormality is stored in the RAM 106. In more detail, the CPU 104 judges in step SR8 whether the value $|e|$ is smaller than the reference value k1, and in step SR9 whether the value $|e|$ is larger than the reference value k2. In step SR10, the CPU 104 finds the specific kind trouble or of abnormality, based on the results of judgements in steps SR8 and SR9 and depending upon the present shifting condition, and then stores the appropriate TROUBLE code in the RAM 106 which serves as code memory means for storing the TROUBLE codes, i.e., coded signals indicative of the troubles associated with the shifting operation.

Figure 3:
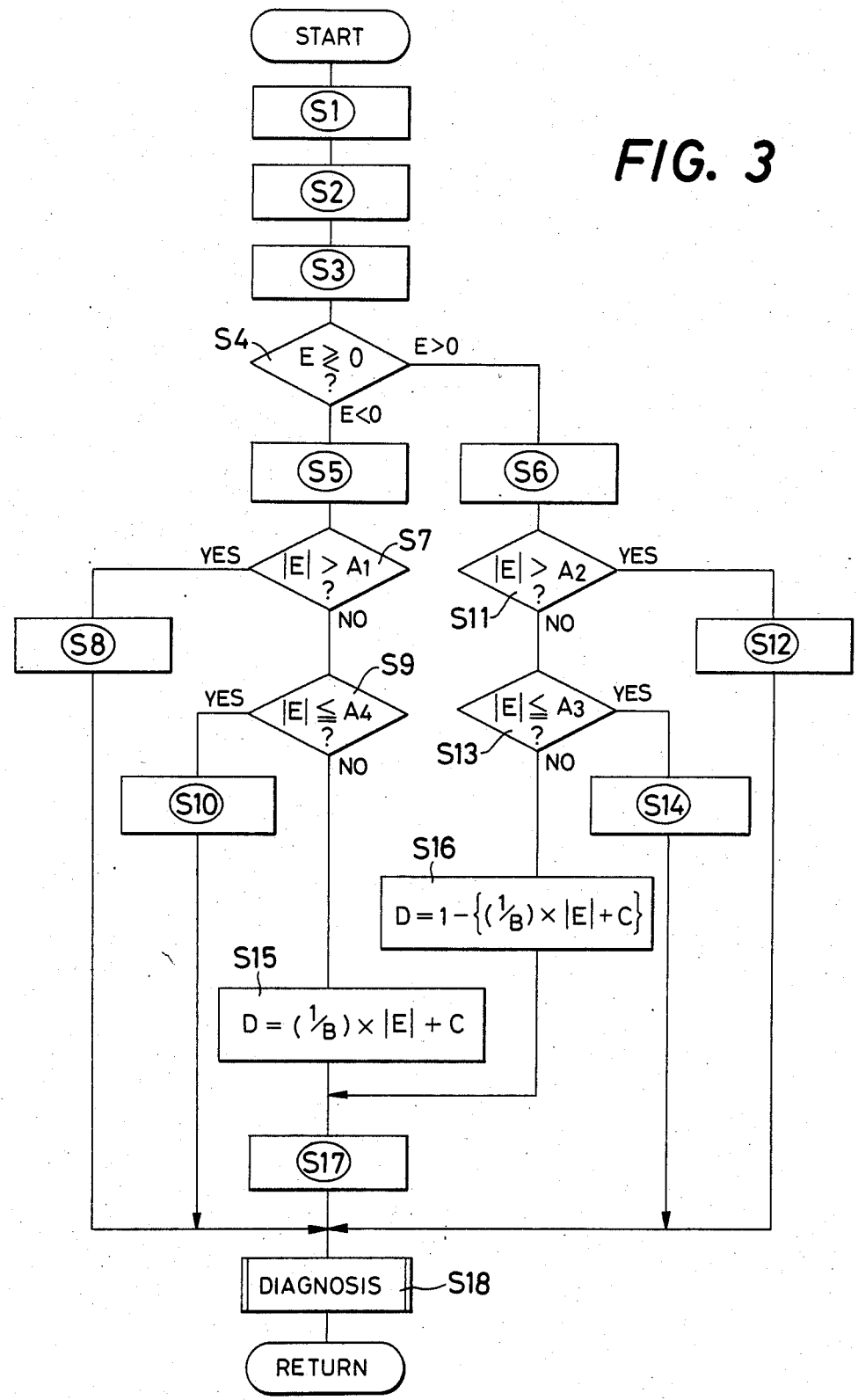

The contents of the TROUBLE codes that may be stored in the RAM 106 in step SR10 are indicated in Table 1 in connection with the different shifting conditions of FIG. 3. It is noted that the value $|e|$ used in steps SR8 and SR9 during the duty cycling control is held within the previously described standard range N shown in FIG. 10. When the value $|e|$ is outside the standard range N, the diagnosis is not effected. It is also noted that although the mechanical arrangement of the transmission 14 can not afford to cause the shifting rate $|e|$ to be excessively high during a rapid shift-down or shift-up operation of (3) or (4) of Table 1, the value D larger than the previously indicated maximum rate Umax is used as the reference value k2 to be used in step SR9.

TABLE 1

| No. | Solenoid Valve 46 | Solenoid Valve 48 | Error $|E|$ | Shifting Condition | Judgement | Contents of Abnormality | TROUBLE codes |
|---|---|---|---|---|---|---|---|
| (1) | ON | ON | $\leq A3$ | Slow Shift-down | $<A$ | Shift-down failure | 11 |
|  |  |  |  |  | $>B$ | Too fast shift-down | 12 |
| (2) | ON | ON/OFF | $\leq A2$ | Shift-down faster than (1) but more slowly than (3) | $<B$ | Slow shift-down | 11 |
|  |  |  |  |  | $>C$ | Too fast shift-down | 13 |
| (3) | ON | OFF | $>A2$ | Rapid Shift-down | $<C$ $>D$ | Too slow shift-down | 14 |
| (4) | OFF | ON | $>A1$ | Rapid Shift-up | $<C$ $>D$ | Too slow shift-up | 24 |

TABLE 1-continued

| No. | Solenoid Valve 46 | Solenoid Valve 48 | Error \|E\| | Shifting Condition | Judgement | Contents of Abnormality | TROUBLE codes |
|---|---|---|---|---|---|---|---|
| (5) | OFF | ON/OFF | ≦A1 | Shift-up faster than (6) but more slowly than (4) | <B | Slow shift-up | 21 |
|  |  |  |  |  | >C | Too fast shift-up | 23 |
| (6) | OFF | OFF | ≦A4 | Slow Shift-up | <A | Shift-up failure | 21 |
|  |  |  |  |  | >B | Too fast shift-up | 22 |

In the case where the judgement in the previously indicated step SR1 reveals that the vehicle has been brought to a stop, the control goes to step SR11 to check if the signal SM to command or trigger the output of the diagnostic result is present or not, that is, if the switch 121 has been actuated or not. If the diagnostic switch 121 has not been actuated, the diagnostic routine is terminated. If the switch 121 is on, the step SR11 is followed by step SR12 wherein the TROUBLE code(s) stored in the RAM 106 is read out, and the ABNORMALITY signal SA corresponding to the read-out TROUBLE code is fed from the I/O port 96 and applied to the voltmeter 120, whereby the voltmeter 120 provides an indication of the TROUBLE code. If the TROUBLE code "12" is stored in the RAM 106, for example, serial pulses SA as illustrated in FIG. 11 (see "VEHICLE STOPPED" section) are generated. Consequently, the indicator needle of the voltmeter 120 is first swung one time and then, after a predetermined time duration G, the needle is swung two times consecutively. Thus, the voltmeter 120 indicates the TROUBLE code "12", and the vehicle driver or serviceman can recognize the presence of the corresponding trouble. In this embodiment, the steps SR7, SR8 and SR9 provide judging means for checking for abnormality of the rate of variation in the speed ratio of the transmission 14, and the diagnostic switch 121, steps SR11 and SR12 provide trigger means for commanding the output of the diagnostic result, i.e., for causing the voltmeter 120 to indicate the trouble in response to the operation of the switch 121.

The diagnostic routine is terminated when the execution of the step SR12 is completed.

In the present embodiment of the invention which has been described, the indication on the voltmeter 120 while the vehicle is stopped, makes it possible to confirm that the shifting operation of the transmission 14 has been conducted in the normal manner, or to know the kinds or contents of abnormalities of the transmission 14 if any. This information facilitates the diagnosis to find defective or faulty components which have caused the abnormality, without having to actually check the individual components under various operating conditions. Thus, the diagnostic apparatus constructed according to the invention permits extremely easy maintenance and repair of the vehicle.

A modified embodiment of the invention will be described, using the same reference characters as used in the preceding embodiment, to identify the corresponding elements or components, which will not be described.

As is apparent from the foregoing description, the diagnostic routine in the preceding embodiment is adapted to check for normal functioning of the transmission 14 in the control of the shifting speed (rate of variation in the speed ratio). For convenience, this routine is referred to as shifting-speed diagnostic routine. It is instead possible to provide an additional step of diagnosing the solenoid valves 46, 48, and/or a speed-ratio diagnostic routine for direct checking of the speed ratio of the transmission 14, in place of or in addition to the shifting-speed diagnostic routine. Stated the other way, the diagnostic routine of the modified embodiment substitutes a series of steps shown in FIG. 12 for the steps SR2, and SR4 through SR10 of the preceding embodiment. Alternatively, the steps of FIG. 12 may be additionally executed following the steps SR9 and SR10 of FIG. 9 of the preceding embodiment.

Figure 13:
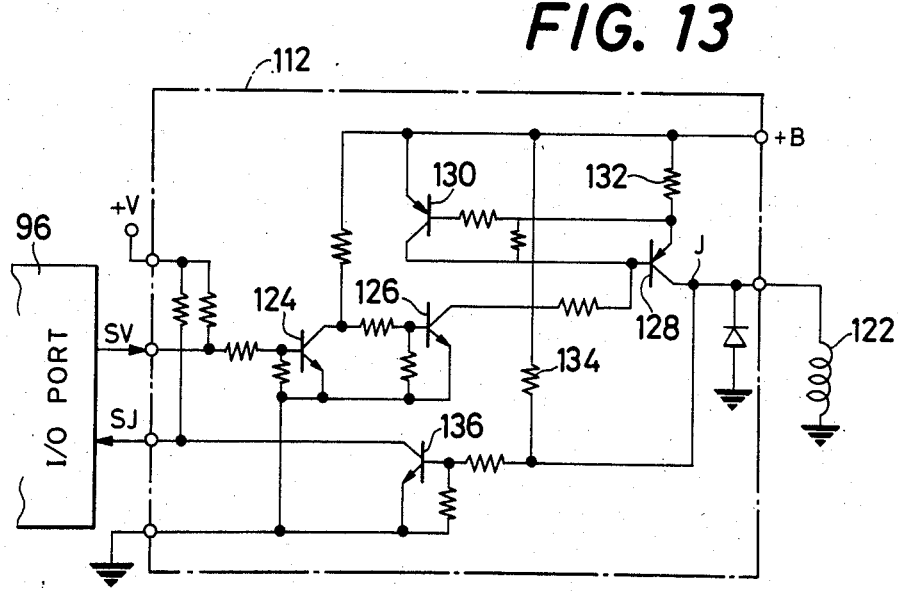
FIG. 13 is a diagram illustrating a driver circuit for actuating the solenoid of the shift-speed control valve unit of FIG. 2.
Figure 12:
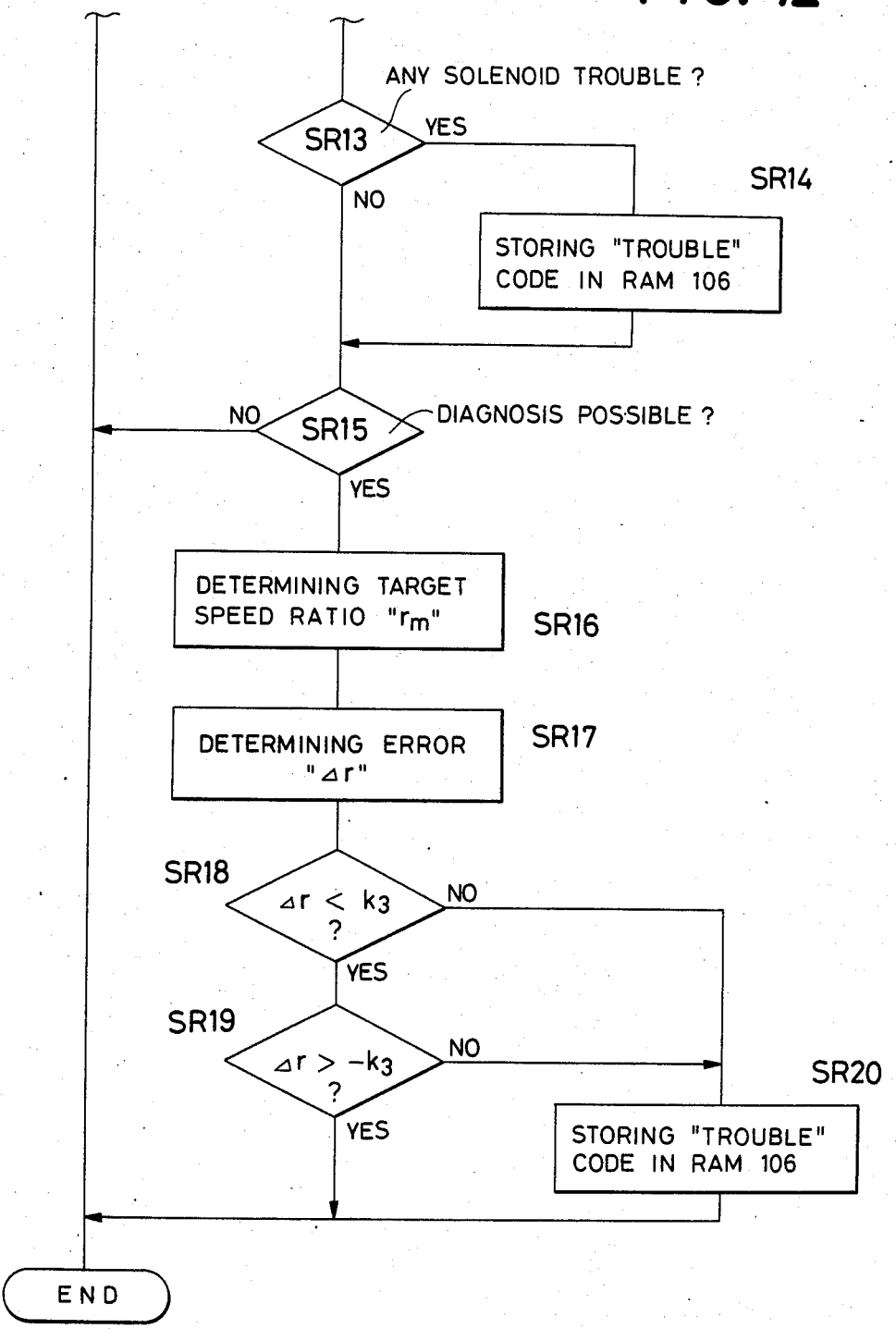
FIG. 12 is a flow chart showing the operation of a modified embodiment of the instant apparatus.

Referring to FIG. 12, steps SR13 and SR14 are executed to check for short-circuiting and disconnection of conductor wires of the solenoids of the solenoid valves 46, 48 of the shift-direction switching and shift-speed control valve units 40, 42 which have been described. In the presence of any such troubles, the TROUBLE codes indicative of the troubles are indicated on the voltmeter 120 to permit easy and efficient maintenance services of the solenoids. In more detail, the step SR13 is executed to check the solenoids of the solenoid valves 46, 48 for any trouble. If no trouble is present, the control goes to step SR15. If the checking in step SR13 indicates the presence of any trouble of the solenoid(s), the step SR13 is followed by step SR14 wherein the TROUBLE code indicative of the trouble is stored in the RAM 106. The checking in the step SR13 is based on the SHIFT DIRECTION and SHIFT VELOCITY command signals SD, SV applied to the driver circuits 110, 112 to actuate the solenoid valves 46, 48, and further based on JUDGEMENT signals SJ which are fed from the driver circuits 110, 112 to the I/O port 96. These driver circuits 110, 112 have the same arrangement, and will be described referring to FIG. 13 which shows the driver circuit 112 for the solenoid valve 48 of the valve unit 42. The solenoid of the solenoid valve 48 is indicated at 122 in FIG. 13.

While the solenoid 122 is normally functioning without short-circuiting and wire disconnection, the driver circuit 112 is supplied with the command signal SV of a high level (H), whereby the solenoid 122 is energized to place the solenoid valve 48 in its ON position. More specifically, a first transistor 124 is turned ON and a second transistor 126 is turned OFF to thereby turn ON a third transistor 128, with a result of applying the amplified SHIFT VELOCITY command signal SV to the solenoid 122 of the solenoid valve 48. On the contrary, while the command signal SV is at a low level (L), the third transistor 128 is held OFF and the solenoid 122 is kept deenergized. Thus, the solenoid 122 of the solenoid valve 112 is selectively energized and deenergized depending upon H or L level of the SHIFT VELOCITY command signal SV which is supplied from the I/O port 96 to the driver circuit 112. A fourth transistor 130 is operated in response to an increase in voltage across a resistor 132 of low resistance for detecting the output drive current of the circuit 112, so as to limit the collector current of the third transistor 128 for the purpose of protecting the driver circuit 112 upon short-circuiting of the solenoid 122.

In the meantime, the output of the solenoid drive current is applied from a power source B to the solenoid 122 via the resistor 132 and the third transistor 128. The disconnection and short-circuiting of the solenoid 122 are detected by way of monitoring the voltage at the end of the solenoid 122 on the side of the power source B (voltage at a point J in FIG. 13). While the drive current is applied to the solenoid 122, the voltage at the point J is held at a predetermined high level (H) near the line voltage of the power source B due to voltage drop of the solenoid 122. While the drive current is not applied to the solenoid 122, the voltage at the point J is held at a predetermined low level (L) near the ground potential, because there is connected a high-resistance resistor 134 between the point J and the power source B. A fifth transistor 136 is turned ON and OFF depending upon the H or L level of the voltage at the point J, whereby the voltage level at the point J is inverted by the fifth transistor 136, which applies the JUDGEMEMT signal SJ of the inverted level to the I/O port 96. That is, while the solenoid 122 is normally functioning, the JUDGEMENT signal SJ to be fed to the I/O port 96 has a level which is an inversion of the level of the SHIFT VELOCITY command signal SV to be applied to the driver circuit 112. In the event of disconnection of the solenoid 122, however, the voltage at the point J is held at the high (H) level regardless of whether the drive current is supplied to the solenoid 122 or not, i.e., whether the command signal SV is applied to the driver circuit 112. Consequently, the JUDGEMENT signal SJ is held at the low (L) level even while the drive current is not applied to the solenoid 122. In the event of short-circuiting of the solenoid 122, on the other hand, the voltage at the point J is held at the low level and the JUDGEMENT signal SJ at the high level even while the drive current is applied to the solenoid 122. In summary, the step SR13 is provided to compare the level of the JUDGEMENT signal SJ with that of the command signal SV, for checking if the solenoid 122 is normal, or disconnected or short-circuited. In this modified embodiment, therefore, the driver circuits 110, 112 and the step SR13 constitute means for detecting disconnection and short-circuiting of the solenoids of the valves 46, 48. In the event of disconnection or short-circuiting trouble being detected in the step SR13, the control goes to step SR14 wherein the TROUBLE code indicative of the trouble is stored in the RAM 106. This TROUBLE code is indicated in the step SR12 by movements of the indicator needle of the voltmeter 120 in the manner previously described. The TROUBLE codes indicative of the troubles with the solenoids of the valves 46, 48 are determined as shown in Table 2.

TABLE 2

| Solenoid Troubles | | TROUBLE Codes |
|---|---|---|
| Solenoid of Solenoid Valve 46 | Wire Disconnection | 31 |
| | Short-Circuiting | 32 |
| Solenoid (122) of Solenoid Valve 48 | Wire Disconnection | 33 |
| | Short-Circuiting | 34 |

Following the steps SR13 and SR14, the speed-ratio diagnostic routine consisting of steps SR15 through SR20 is executed. In this step SR15, the CPU 104 checks if the diagnosis of the speed ratio "r" is possible or not. This checking step SR15 is achieved for the following reason. That is, a target speed ratio "rm" is transitional (not fixed) until the target engine speed $N_D$ has been fixed (stabilized at a given level). In this state, it is difficult to diagnose the current speed ratio "r". To check if the target speed ratio "rm" is in the transitional (changing) state or not, the judgement is made in the step SR15 to find, for example, whether the throttle opening angle $\theta$ determined by the amount of depression of the accelerator pedal 88 is substantially fixed at a given level, i.e., whether the rate of variation $\Delta\theta/\Delta T$ of the opening angle $\theta$ is lower than a predetermined value P, where the value $\Delta\theta$ represents a difference between the opening angle $\theta'$ stored in step S1 in the preceding cycle, and the opening angle $\theta$ obtained in the step S1 in the current cycle.

In the case where the judgement in step SR15 reveals that the rate of variation $\Delta\theta/\Delta T$ of the throttle opening angle $\theta$ is higher than the predetermined value P, the diagnostic routine is terminated because the speed ratio "r" is in the transitional state. If the rate of variation $\Delta\theta/\Delta T$ is judged to be lower than the value P, the control goes to step SR16 to calculate the target speed ratio "rm" by dividing the target engine speed $N_D$ (obtained in step S2) by the actual speed $N_O$ of the output shaft 20 (obtained in step S1). Although the target speed ratio "rm" of this modified embodiment is not the primary variable (target engine speed $N_D$) which is directly controlled by the previously indicated control system (CPU 104, RAM 106, ROM 108, etc.), the target speed ratio "rm" is determined by the target engine speed $N_D$ and therefore considered to be an ancillary variable to be controlled. In the speed-ratio diagnostic routine in this embodiment, the diagnosis is implemented by comparing the target and actual speed ratios "rm" and "r".

The above step SR16 is followed by step SR17 to calculate an error $\Delta r$ (difference) between the target speed ratio "rm" calculated in step SR16 and the actual speed ratio "r" obtained in step SR3. Successively, the control goes to steps SR18 and SR19 to check if the error $\Delta r$ is greater than a predetermined reference value k3 stored in the ROM 18, and smaller than a predetermined reference value $-k3$ also stored in the ROM 108. These reference values K3 and $-k3$ define a normal range of the error $\Delta r$. If the error $\Delta r$ falls within the normal range, it means a good or satisfactory response of the actual speed ratio "r" to the target speed ratio "rm", that is, normal shifting operation of the variable transmission 14. In this instance, the diagnostic routine is terminated. If the error $\Delta r$ is equal to or greater than the value k3 or smaller than the value $-k3$ (outside the normal range), it means an excessive deviation of the actual speed ratio "r" from the target speed ratio "rm". In this condition, the step SR 19 is followed by step SR20 wherein the TROUBLE code corresponding to the trouble associated with the speed ratio is stored in the RAM 106. The detected trouble is indicated in step SR12 by the swing movements of the indicator needle of the voltmeter 120, as previously discussed. As is apparent from the foregoing description, the steps SR16 through SR19 provide judging means for checking for the presence of troubles associated with the speed ratio of the transmission 14. This judging means checks to see if the speed ratio "r" falls within a normal range which is defined by the upper limit $rm+k3$ and the lower limit $rm-k3$. In this embodiment, the TROUBLE codes indicative of the speed-ratio troubles are determined as shown in Table 3.

TABLE 3

| Troubles Associated With Speed Ratio | TROUBLE Codes |
| --- | --- |
| Excessively High Speed Ratio in Shift-up | 41 |
| Excessively High Speed Ratio in Shift-down | 42 |
| Excessively Low Speed Ratio in Shift-up | 43 |
| Excessively Low Speed Ratio in Shift-down | 44 |

In this case where the step SR12 is executed while TROUBLE codes are stored in the RAM 106, the codes are indicated on the voltmeter 120 one after another in the predetermined order of priority.

While the present invention has been described in its preferred embodiments for illustrative purpose only, it is to be understood that the invention is not confined to the precise disclosure.

For example, while the reference values k1 and k2 which define a normal range of the absolute value $|e|$ of the rate of variation in the speed ratio are selected from among the four values A through D in the illustrated first embodiment, the values k1 and k2 may be selected from more than four reference values, so that the comparison of the value $|e|$ with the references k1 and k2 permits closer diagnosis of the shifting operations of the transmission, and provides more accurate information on the possible troubles.

Although the illustrated first embodiment uses the reference values k1 and k2 commonly for the shift-up and shift-down operations of the transmission 14 so as to check the value $|e|$, it is appreciated to use one set of reference values k1 and k2 for the shift-up operation, and another set of values for the shift-down operation. This arrangement assures increased diagnostic accuracy of the apparatus.

While the illustrated embodiments are adapted such that the trouble indicating TROUBLE codes stored in the RAM 106 are indicated by the indicator needle of the voltmeter 120 only after the vehicle has been brought to a stop, it is possible to indicate these TROUBLE codes while the vehicle is running. Further, the manipulation of the diagnostic switch 121 to indicate the codes may be replaced by short-circuiting a suitable terminal when it is desired to indicate the TROUBLE codes.

As a further modification, the indication of the TROUBLE codes on the voltmeter 120 may be effected in such a manner that the first digit of the codes is indicated by the deflection (swing) of the indicator needle in one direction, and the second digit by the deflection of the needle in the opposite direction. Where the indication is made in a voltage range of 0 to 5 V, for example, the first digit is indicated by the needle deflection from the 2.5 V position to the 5 V position while the second digit by the deflection from the 2.5 V position to the 0 V position. It is also appreciated that the TROUBLE codes be indicated by flickering actions of a indicator light or by numerals on a digital display, or alternatively the troubles or their causes represented by the TROUBLE codes are indicated by corresponding messages provided on suitable display means such as dot-matrix character displays using liquid crystals or LEDs.

Although the illustrated embodiments are associated with the belt-and-pulley type variable transmission 14 wherein the shifting speed is continuously controlled by regulating the supply and discharge flows of the working fluid to and from the hydraulic cylinder 26 on the input side of the transmission 14 by way of controlling the duty cycle of the shift-speed control valve unit 42, it will be obvious to employ a proportional flow control valve to regulate the fluid flows to and from the cylinder 26, or to use an electric drive motor for changing the effective diameter of the first variable-diameter pulley 18, for example. Further, the principle of the present invention is also applicable to a continuously variable transmission other than the belt-and-pulley type.

In the illustrated embodiments, the control system for the transmission is adapted to control the shifting speed (rate of variation in the speed ratio) according to the variation in the error $|e|$. However, the diagnostic apparatus of the invention is usable in connection with a control system which is adapted to change the speed ratio at a fixed rate in both shift-up and shift-down directions.

While the illustrated embodiments are so designed that the speed ratio "r" is controlled for agreement of the actual engine speed $N_A$ with the target engine speed $N_D$, the principle of the instant invention is usable with a control system which controls the actual speed ratio "r" into agreement with the target speed ratio "rm".

It is to be understood that the present invention may be embodied with other changes, modification and improvements which are obvious to those skilled in the art, without departing from the scope of the invention defined in the appended claims.

What is claimed is:

1. In an automatic vehicle having (a) a continuously variable transmission for transmitting the output of an engine to drive wheels at a steplessly variable speed ratio, (b) a control system operable to determine a target speed ratio of the transmission, and (c) a shift-regulating device responsive to the control system to control the speed ratio of the transmission so that an actual speed ratio of the transmission coincides with said target speed ratio, a diagnostic apparatus for checking whether the speed ratio of said transmission is normally controlled, said diagnostic apparatus comprising:
   detecting means for detecting said actual speed ratio of said transmission;
   calculating means for determining a difference between said target speed ratio and said actual speed ratio of the transmission;
   memory means storing data for determining a normal range of said difference between said target speed ratio and said actual speed ratio of the transmission; and
   judging means for checking whether or not the determined difference falls within said normal range.

2. The diagnostic apparatus of claim 1, wherein said judging means is operative while a rate of variation in opening angle of a throttle valve of the vehicle is smaller than a predetermined limit.

3. The diagnostic apparatus of claim 1, which further comprises:
   code memory means for storing a coded signal indicative of a trouble if said judging means has determined that said determined difference does not fall within said normal range;
   indicator means for indicating said trouble represented by said coded signal; and
   trigger means including an operator-controlled member, for causing said indicator means to indicate said trouble in response to the operation of said operator-controlled member.

4. The diagnostic apparatus of claim 3, wherein said coded signal stored in said code memory means represents a shifting condition of the transmission which is determined by command signals from said control system when said judging means has detected said trouble.

5. The diagnostic apparatus of claim 3, wherein said trigger means is operative when said operator-controlled member is operated while the vehicle is stopped.

6. The diagnostic apparatus of claim 3, wherein said indicator means indicates said actual speed ratio detected by said detecting means, while the vehicle is running.

7. The diagnostic apparatus of claim 3, wherein said indicator means comprises a voltmeter having an analog indicator needle and operated by serial pulses corresponding to said coded signal.

8. The diagnostic apparatus of claim 3, wherein said shift-regulating device includes a shift-direction switching valve unit having a first solenoid, and a shift-speed control valve unit having a second solenoid, and which further comprises:
  detector means for detecting the disconnection and/or short-circuiting of conductor wires of said first and second solenoids, said code memory means storing coded signals indicative of disconnection and/or short-circuiting troubles detected by said detector means.

9. The diagnostic apparatus of claim 8, wherein said code memory means stores a plurality of coded signals indicative of plural troubles recognized by said judging means and said detector means, said coded signals being output in a predetermined order in response to the operation of said operator-controlled member.

10. In an automotive vehicle having (a) a continuously variable transmission for transmitting the output of an engine to drive wheels at a steplessly variable speed ratio, (b) a control system, and (c) a shift-regulating device responsive to the control system to change the speed ratio and a rate of variation in the speed ratio of the transmission, a diagnostic apparatus for checking whether the speed ratio of said transmission is normally controlled, said diagnostic apparatus comprising:
  detecting means for detecting an actual rate of variation in the speed ratio of said transmission;
  memory means storing data for determining normal ranges of the rate of variation in the speed ratio of the transmission corresponding to shifting conditions of the transmission which are to be established by said shift-regulating device according to command signals from said control system; and
  judging means for selecting one of said normal ranges of the rate of variation based on the command signals to said shift-regulating device, and checking whether the detected actual rate of variation falls within the selected normal range.

11. The diagnostic apparatus of claim 10, wherein said judging means is operative while a margin of variation in the speed ratio to its upper or lower limit is greater than a predetermined value.

12. The diagnostic apparatus of claim 10, which further comprises:
  code memory means for storing a coded signal indicative of a trouble if said judging means has determined that said detected actual rate of variation does not fall within said selected normal range;
  indicator means for indicating said trouble represented by said coded signal; and
  trigger means including an operator-controlled member, for causing said indicator means to indicate said trouble in response to the operation of said operator-controlled member.

13. The diagnostic apparatus of claim 12, wherein said coded signal stored in said code memory means represented a shifting condition of the transmission which is determined by command signals from said control system when said judging means has detected said trouble.

14. The diagnostic apparatus of claim 12, wherein said trigger means is operative when said operator-controlled member is operated while the vehicle is stopped.

15. The diagnostic apparatus of claim 12, wherein said indicator means comprises a voltmeter having an analog indicator needle and operated by serial pulses corresponding to the coded signal.

16. The diagnostic apparatus of claim 12, wherein said shift-regulating device includes a shift-direction switching valve unit having a first solenoid, and a shift-speed control valve unit having a second solenoid, and which further comprises:
  detector means for detecting the disconnection and/or short-circuiting of conductor wires of said first and second solenoids, said code memory means storing coded signals indicative of disconnection and/or short-circuiting troubles detected by said detector means.

17. The diagnostic apparatus of claim 16, wherein said code memory means stores a plurality of coded signals indicative of plural troubles recognized by said judging means and said detector means, said coded signals being output in a predetermined order in response to the operation of said operator-controlled member.

18. In an automatic vehicle having (a) a continuously variable transmission for transmitting the output of an engine to drive wheels at a steplessly variable speed ratio, (b) a control system operable to determine a target speed ratio of the transmission, and (c) a shift-regulating device responsive to the control system to control the speed ratio and a rate of variation in the speed ratio of the transmission so that an actual speed ratio of the transmission coincides with said target speed ratio, a diagnostic apparatus for checking whether the speed ratio of said transmission is normally controlled, said diagnostic apparatus comprising:
  detecting means for detecting said actual speed ratio of said transmission, and an actual rate of variation in said actual speed ratio;
  calculating means for determining a difference between said target speed ratio and said actual speed ratio of the transmission;
  memory means storing data for determining a normal range of said difference between said target speed ratio and said actual speed ratio of the transmission, and data representative of normal ranges of the rate of variation in said speed ratio, said normal ranges of said rate of variation corresponding to shifting conditions of the transmission which are to be established by said shift-regulating device according to command signals from said control system; and
  judging means for selecting one of said normal ranges of the rate of variation based on the command signals to said shift-regulating device, and checking whether or not the determined difference between said target and actual speed ratios falls within said normal range of the difference, and whether or not the detected actual rate of variation falls within the selected normal range of the rate of variation in the speed ratio.

19. The diagnostic apparatus of claim 18, wherein said judging means is operative while a margin of variation in the speed ratio to its upper or lower limit is greater than a predetermined value.

20. The diagnostic apparatus of claim 18, wherein said judging means is operative while a rate of variation in opening angle of a throttle valve of the vehicle is smaller than a predetermined limit.

21. The diagnostic apparatus of claim 18, which further comprises:
code memory means for storing a coded signal indicative of a trouble if said judging means has determined that said determined difference does not fall within said normal range of the difference, or said detected actual rate of variation does not fall within said selected normal range of the rate of variation in the speed range;
indicator means for indicating said trouble represented by said coded signal; and
trigger means including an operator-controlled member, for causing said indicator means to indicate said trouble in response to the operation of said operator-controlled member.

22. The diagnostic apparatus of claim 21, wherein said coded signal stored in said code memory means represents a shifting condition of the transmission which is determined by command signals from said control system when said judging means has detected said trouble.

23. The diagnostic apparatus of claim 21, wherein said trigger means is operative when said operator-controlled member is operated while the vehicle is stopped.

24. The diagnostic apparatus of claim 21, wherein said indicator means indicates said actual speed ratio detected by said detecting means, while the vehicle is running.

25. The diagnostic apparatus of claim 21, wherein said indicator means comprises a voltmeter having an analog indicator needle and operated by serial pulses corresponding to the coded signal.

26. The diagnostic apparatus of claim 21, wherein said shift-regulating device includes a shift-direction switching valve unit having a first solenoid, and a shift-speed control valve unit having a second solenoid, and which further comprises:
detector means for detecting the disconnection and/or short-circuiting of conductor wires of said first and second solenoids, said code memory means storing coded signals indicative of disconnection and/or short-circuiting troubles detected by said detector means.

27. The diagnostic apparatus of claim 26, wherein said code memory means stores a plurality of coded signals indicative of plural troubles recognized by said judging means and said detector means, said coded signals being output in a predetermined order in response to the operation of said operator-controlled member.

28. In an automatic vehicle having (a) a continuously variable transmission for transmitting the output of an engine to drive wheels at a steplessly variable speed ratio, (b) a control system operable to determine a target speed ratio of the transmission, and (c) a shift-regulating device responsive to the control system to control the speed ratio of the transmission so that an actual speed ratio of the transmission coincides with said target speed ratio, a diagnostic apparatus for checking whether the speed ratio of said transmission is normally controlled, said diagnostic apparatus comprising:
first detecting means for detecting said actual speed ratio of said transmission;
second detecting means for detecting an actual speed of said engine;
first calculating means for determining a target speed of said engine;
second calculating means for determining a difference between the determined target speed ratio and the detected actual speed ratio of the transmission;
determining means for determining, based on the determined target speed of the engine and the detected actual speed of the engine, a direction in which the actual speed ratio of the transmission is changed by said shift-regulating means;
first memory means storing data for determining a normal range of said difference between said target speed ratio and said actual speed ratio of the transmission;
judging means for checking whether or not the determined difference falls within said normal range;
second memory means for storing a coded signal indicative of a trouble if said judging means has determined that said determined difference does not fall within said normal range, said coded signal indicating whether said determined difference exceeds an upper limit or a lower limit of said normal range, and also indicating the direction of change of the actual speed ratio of the transmission which has been determined when said judging means has determined that said determined difference exceeds said upper and lower limit.

29. In an automotive vehicle having (a) a continuously variable transmission for transmitting the output of an engine to drive wheels at a steplessly variable speed ratio, (b) a control system operable to determine a target speed of the engine, and (c) a shift-regulating device responsive to the control system to control the speed ratio of the transmission so that an actual speed of the engine coincides with the determined target speed of the engine, a diagnostic apparatus for checking whether the speed ratio of the transmission is normally controlled, said diagnostic apparatus comprising:
first detecting means for detecting said actual speed of the engine;
second detecting means for detecting an actual rate of variation in the speed ratio of the transmission;
determining means for determining, based on the determined target speed of the engine and the detected actual speed of the engine, a shifting direction in which an actual speed ratio of the transmission is changed by said shift-regulating means, and an amount of error between said determined target speed and said detected actual speed of the engine;
first memory means storing data for determining normal ranges of the rate of variation in the speed ratio of the transmission corresponding to shifting conditions of the transmission which are determined by said shifting direction and said amount of error determined by said determining means;
judging means for selecting one of said normal ranges of the rate of variation based on said shifting conditions, and checking whether or not the detected actual rate of variation falls within the selected normal range; and second memory means for storing a coded signal indicative of a trouble if said judging means has determined that said actual rate of variation does not fall within said selected normal range, said coded signal indicating whether said actual rate of variation exceeds an upper or lower limit of said selected normal range, and also indicating the shifting conditions which corresponds to said selected normal range.

* * * * *